June 26, 1934.    T. H. WILLIAMS    1,964,681
EXTRUDING MACHINE
Filed Dec. 22, 1931

INVENTOR
THOMAS H. WILLIAMS
BY Ely & Barrow
ATTORNEYS

Patented June 26, 1934

1,964,681

UNITED STATES PATENT OFFICE 1,964,681

EXTRUDING MACHINE

Thomas H. Williams, Cuyahoga Falls, Ohio, assignor to National Rubber Machinery Company, Akron, Ohio, a corporation of Ohio Application December 22, 1931, Serial No. 582,531

9 Claims. (Cl. 146—174)

This invention relates to extruding machines and particularly to extruding machines of the strainer type such as is employed for the refining of rubber.

Heretofore the production of such machinery has been limited due to the fact that the faster the stock is worked the more heat by friction is developed and excess heat scorches the stock, spoiling it for its intended uses.

The general purpose of the invention is to provide an extruding machine or refiner for rubber or like thermoplastic materials constructed in such manner that the temperature of the stock therein may be so controlled that the machine may be operated at greatly increased speeds without scorching and thus spoiling the stock.

The foregoing and other purposes of the invention are attained in the strainer machine illustrated in the accompanying drawing and described below. It is to be understood that the invention is not limited to the specific form thereof shown and described.

Figure 1:
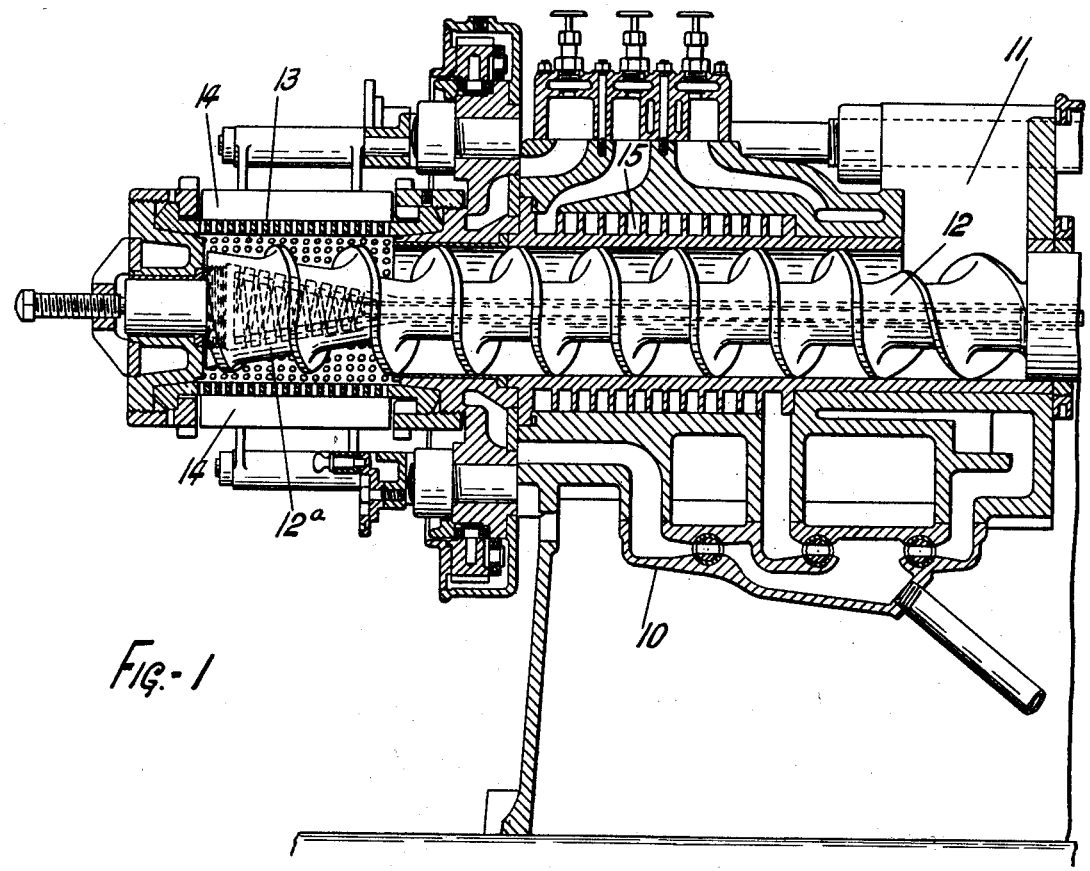
Figure 2:
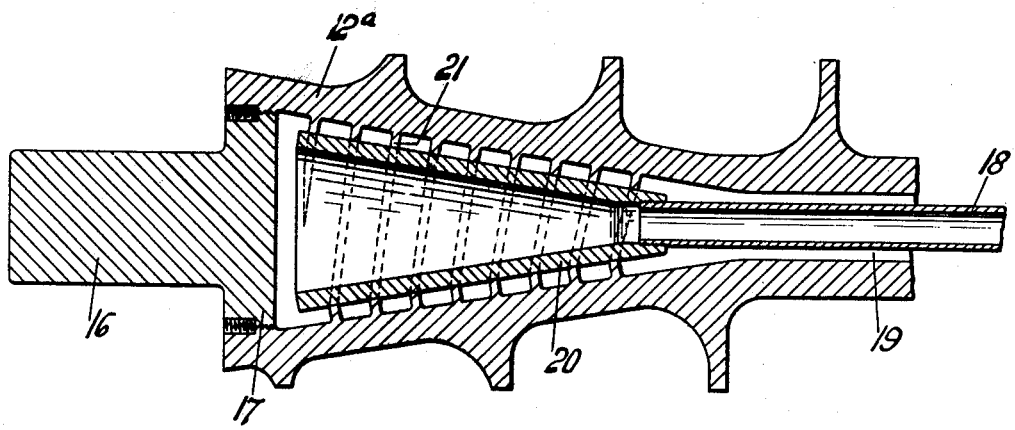

Of the accompanying drawing,

Figure 1 is a longitudinal, vertical section through a portion of a strainer embodying the invention; and Figure 2 is an enlarged sectional view of the head end of the strainer screw.

Referring to the drawing, the numeral 10 designates a known form of extruding machine or strainer such as used in the refining of rubber and having an inlet for the rubber at 11, a screw 12 for feeding and working the rubber through the machine, a screening head 13 through which the rubber is extruded and knives 14, 14 for cutting the issuing strands of rubber. Such strainers include suitable fluid circulating systems as at 15 for controlling the temperature of the rubber stock in the body of the strainer or extruding machine whereby it is maintained at proper working consistency without overheating.

The present invention relates to the construction of the screw and the arrangement for cooling the same in the strainer head. As shown at 12$^a$ the portion of the screw in the strainer head is enlarged gradually outwardly or flared toward its end. This prevents the accumulation of a large mass of stock working around in the head which would tend to heat up due to the friction therein. The screw 12 is hollow for the purpose of circulating a cooling medium therein, and to this end is formed with a bore 19 that is flared within the enlarged end portion of the screw, complementally with relation to the external flare of the latter, whereby an increased cooling area is provided interiorly of the screw and the wall-thickness of the screw is maintained substantially uniform throughout its length. The outer end of the screw is closed by the screw trunnion 16 which may have an enlarged threaded end portion 17 threaded into the end of the screw.

The most effective circulation of a temperature controlling medium through the screw may be obtained by mounting a pipe 18 within the bore 19 of the screw, connecting said pipe onto a hollow, conical member 20 within the flared end portion of the said bore and arranging a helical rib 21 about the conical member preferably integral with the wall of the screw whereby water or other temperature controlling fluid may be circulated through the pipe 18 and conical member 20 to the end of the screw and then helically in the space between the convolutions 21 between the conical member and the wall of the screw back through the screw about the pipe 18 in the bore 19. Thus in cooling the stock the coldest water is supplied at the outer end of the screw where the stock would tend to be hottest.

The increase in the size of the screw in the head coupled with the increased cooling area of the inner surface of its wall and preferably with the helical circulation of temperature controlling medium adjacent said surface and counter to the direction in which the stock is fed by the screw results in a strainer, the production of which may be increased by speeding up the machine far in excess of that employed in prior practice while maintaining the stock well below a temperature at which it would be scorched.

Modifications of the invention may be resorted to without departing from the spirit thereof or the scope of the appended claims.

What is claimed is:—

1. A strainer construction including a strainer head, means for feeding material into and extruding it through said strainer head, said means including a screw, a portion of said screw extending into said head, said portion of the screw being enlarged in the head to reduce the volume of material in the head, said portion of the screw being hollow, and means for circulating a fluid temperature controlling medium through said hollow portion of the screw, said means including a pipe extended through the bore of the screw, a hollow member in said hollow portion defining a confined space adjacent the inner surface of the wall of said portion of the screw, said pipe being connected to said member, and a helical rib about said member between it and the wall of said portion for defining a helical passageway whereby a fluid temperature controlling medium may be circulated in through said pipe into said portion of the screw through said hollow member and out about said hollow member and back through the screw about said pipe.

2. A strainer construction including a strainer head, means for feeding material into and extruding it through said strainer head, said means including a screw, a portion of said screw extending into said head, said portion of the screw being enlarged in the head to reduce the volume of material in the head, said portion of the screw being hollow, and means for circulating a fluid temperature controlling medium through said hollow portion of the screw, said means including a pipe extended through the bore of the screw, a hollow member in said hollow portion defining a confined space adjacent the inner surface of the wall of said portion of the screw, said pipe being connected to said member, whereby a fluid temperature controlling medium may be circulated in through said pipe into said portion of the screw through said hollow member and out about said hollow member and back through the screw about said pipe.

3. A strainer construction including a strainer head, means for feeding material into and extruding it through said strainer head, said means including a screw, a portion of said screw extending into said head, said portion of the screw being enlarged in the head to reduce the volume of material in the head, said screw being hollow and of uniform wall thickness throughout its length, and means for circulating a fluid temperature controlling medium in a circuitous course through the enlarged head of said screw.

4. In a strainer, a strainer head, means for feeding material therein and extruding the material therefrom comprising a screw extending into said head, the portion of the screw in the head being gradually flared toward the outer end of the head, said flared portion of the screw being formed with a complementally flared bore, and means for circulating a fluid temperature controlling medium through said bore in a circuitous course from the large end toward the small end thereof.

5. A strainer construction comprising a strainer head, means for feeding material into and extruding it from said strainer head comprising a screw, said screw having a portion thereof extending into said head and gradually flared toward its end, said screw being formed with an axial bore that is complementally flared within the flared end portion of the screw, and means for circulating a fluid temperature controlling medium through to the screw, said means including a pipe positioned in the bore of the screw and a concentric conical member positioned in the flared portion of said bore and spaced from the wall thereof to define a passage for fluid delivered thereto through said pipe.

6. A combination as defined in claim 5 including a helical rib disposed about the surface of the conical member.

7. A strainer comprising a screening head, a feed screw for forcing material into and through said head, said screw having a gradually flared end portion positioned in said head, said screw being formed with an axial bore that is flared complementally to its flared end portion, within the latter, and means for circulating a fluid temperature controlling medium through the screw, said means including a pipe in the bore of the screw spaced from the wall thereof, and a hollow conical member mounted at its small end on the end of the pipe, said conical member being disposed within the flared portion of the bore and spaced from the wall and end thereof so that fluid from the pipe will pass out of its larger end, flow over its outer surface and pass out of the screw through the bore surrounding the pipe.

8. A strainer as defined in claim 7 including a helically arranged rib defining a circuitous passage for fluid around the exterior of the conical member.

9. A strainer as defined in claim 7 in which the flared portion of the bore of the screw is formed with a helical rib that abuts the surface of the conical member to define a circuitous passage for fluid thereabout.

THOMAS H. WILLIAMS.